Nov. 23, 1965 J. B. WOLFINGTON 3,219,805
GATED COUNTERS
Filed Oct. 1, 1962
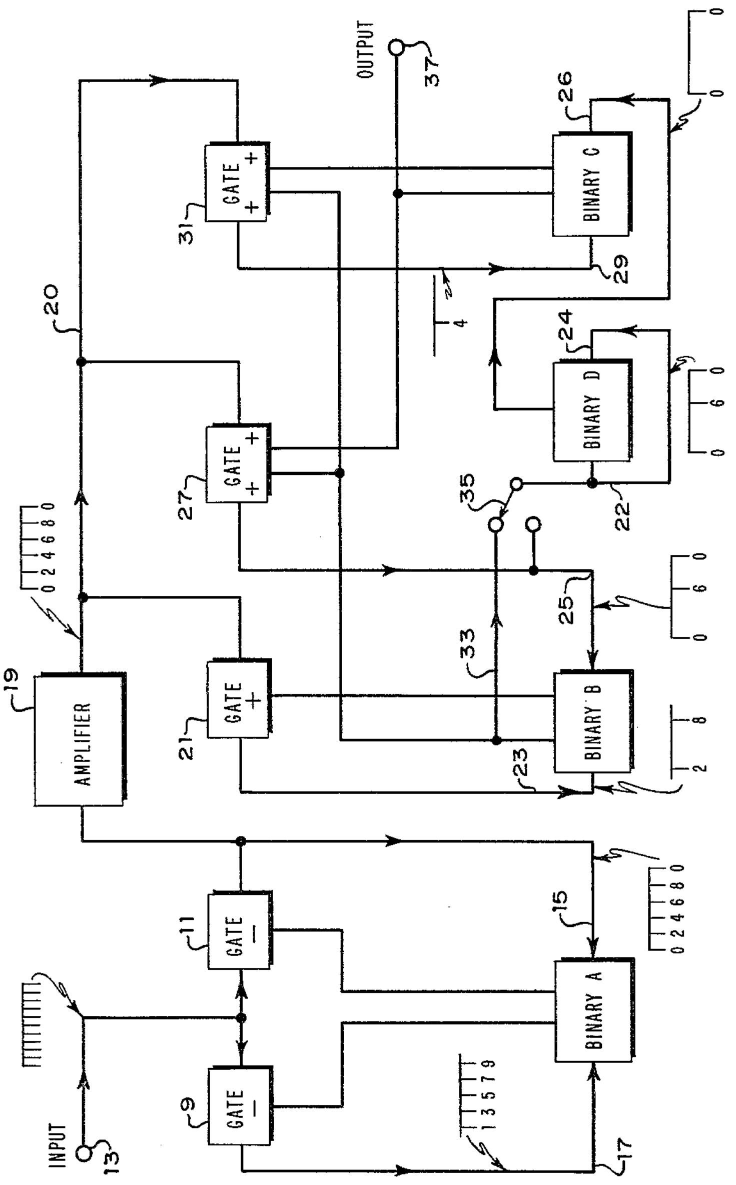
INVENTOR
JEFFERY B. WOLFINGTON
BY J. C. [signature]
ATTORNEY 3,219,805
Patented Nov. 23, 1965

3,219,805

GATED COUNTERS

Jeffery B. Wolfington, Palo Alto, Calif., assignor to Hewlett-Packard Company, Palo Alto, Calif., a corporation of California Filed Oct. 1, 1962, Ser. No. 227,387
2 Claims. (Cl. 235—92)

This invention relates to circuits for counting electrical signals having very high repetition rates.

Decade counting circuits generally use signal feedback or signal gating schemes to eliminate six undesirable operating states of the sixteen possible operating states of four binary elements. Signal feedback is generally undesirable in counters operating at frequencies of the order of 50 to 100 megacycles per second because of the delay inherent in the propagation of feedback signals and because of the intentional delay of circuit operation until transients due to the feedback signals disappear. Gated counters operate more reliably at these frequencies because feedback signals and resulting transients occurring between counts are eliminated. In counters of this type gates are enabled prior to the application of a signal to be counted, thereby permitting selected binary elements to be triggered immediately upon application of a signal to be counted. Gated counters are described in the literature (see "Decade Counter Requires No Feedback," E. L. Kemp, Electronics, February 1953, pages 445–447). It is desirable in counters of this type to eliminate the dependency of binary elements upon the change in operating states of preceding binary elements. This allows a counter to respond to applied signals without the delay which results from driving binary elements using pulses derived from the changing states of preceding elements. Also, it is desirable to minimize the possibility of improperly triggering binary elements when using driving pulses of large amplitudes. This reduces the possibility of the countertaking an erroneous count of applied electrical signals.

Accordingly, it is an object of the present invention to provide an improved gated counting circuit which counts recurring electrical signals at repetition rates of the order of 100 megacycles per second.

It is another object of the present invention to provide a gated counting circuit in which the probability of an erroneous count resulting from overdriving the inputs of a binary element is reduced.

In accordance with the illustrated embodiment of the present invention successively applied pulses are gated alternately to each of the pair of inputs of the first binary element. Signal for triggering successive stages is derived from the input circuit of the first binary element and thus is not delayed by its switching time. This trigger signal is applied to selected ones of the binary elements through gates which are responsive to the combinations of operating states of the remaining binary elements. The accompanying drawing shows a schematic diagram of the gated counter of the present invention.

Referring now to the drawing there is shown a pair of gates 9 and 11 connected between each of the inputs 15 and 17 of binary A and the input terminal 13. Binaries B, D and C are connected in cascade in that order. The signal appearing at one input 15 of binary A is applied through amplifier 19 and gate 21 to input 23 of binary B. The amplified signal is applied to the other input 25 of binary B through gate 27 and is applied to the input 29 of binary C through gate 31. The output signal produced by one half section of binary B is applied to gate 27 and to gate 31 and the output signal produced by the other half section of binary B is applied to gate 21. The output signal produced by one half section of binary C is applied to gate 27 and the output signal produced by the other half section of binary C is applied to gate 31.

In operation, electrical signals to be counted appear at input terminal 13 and are applied to the inputs of gates 9 and 11. Binaries A, B, C and D are all set to the initial condition of stability at the zero count. Binary A, operating in the initial condition of stability, produces an output signal of negative polarity at the left half section. Gate 9 is enabled by this output signal from binary A and the first signal to be counted passes through gate 9 to the input 17 of binary A. This first signal to be counted triggers binary A to the actuated condition of stability, which condition of stability is identified by an output signal produced by the right half section of the binary. This output signal enables gate 11 and the second signal to be counted passes through gate 11 to the other input 15 of binary A. In this manner, alternate ones of the signals to be counted are applied to each of the inputs 15 and 17 of binary A.

At the same time, a trigger signal for the remaining binaries B, C and D is derived from the output of gate 11. A trigger signal is thus provided on line 20 at alternate occurrences of the signals to be counted at input terminal 13. A trigger signal derived in this manner rather than from an output of binary A has two advantages. First, a trigger signal is provided for switching other binaries at the instant a signal for switching binary A is applied to one of its inputs. This eliminates the delay which is usually associated with the switching time of a binary. Secondly, the trigger signals are readily provided from the signals to be counted which appear at input terminal 13. This eliminates circuits to differentiate the output signal from binary A and to shape the pulse thus derived for driving successive binaries.

The trigger signals appearing at the output of amplifier 19 are applied to selected ones of the binaries B, C and D through gates 21, 27 and 31 which are responsive to the conditions of stability in which binaries B and C operate. At the zero count, binaries B, C and D are set to the initial condition of stability, which condition of stability is identified by an output signal of positive polarity from the right half section. The output signal produced by the right half section of binary B enables gate 21 and thus permits the trigger signal produced at the second count to be applied without delay to input 23 of binary B. This trigger signal causes binary B to switch to the actuated condition of stability as indicated by an output signal of positive polarity from the left half section. The combination of this output signal and the output signal from binary C operating in the initial condition of stability enables gate 31. The trigger signal provided on the fourth count is thus applied through gate 31 without delay to input 29 of binary C. This causes binary C to switch to the actuated condition of stability as indicated by an output signal of positive polarity from the left half section of binary C. The combination of this output signal and the output signal from binary B operating in the actuated condition of stability enables gate 27. The trigger signal provided at the sixth count is thus applied through gate 27 without delay to input 25 of binary B. This trigger signal switches binary B to the initial condition of stability. A signal derived from the change in operating states of binary B is applied to the inputs 22 and 24 of binary D. This signal switches binary D to the actuated condition of stability. At the same time the output signal from the right half section of binary B enables gate 21. The trigger signal provided at the eighth count is applied through gate 21 to the input 23 of binary B. This switches binary B to the actuated condition of stability. The combination of the output signals from binaries B and C operating in the actuated conditions of stability enables gate 27. A trigger signal provided at the tenth count is thus applied through gate 27 to the input 25 of binary B, which signal switches binary B to the initial condition of stability. The change in the conditions of stability of binary B provides a signal which is applied to binary D and which causes that binary to switch to its initial condition of stability. This produces a signal which is applied to the input 26 of binary C and which causes that binary to switch to the initial condition of stability. Thus, all binaries are restored to the initial condition of stability at the tenth count.

The delay which results between the appearance of trigger signals at the sixth and tenth counts and the signals applied to binary D from the output of binary B and which is attributable to the switching time of binary B may be reduced by connecting the inputs of binary D to the output of gate 27. It should be noted that the application of trigger signals to the input 25 of binary B at the sixth and tenth counts is followed by the appearance of signals on line 33 which are derived from the changes in the conditions of stability of that binary, which signals are applied to the inputs 22 and 24 of binary D. Thus, switch 35 may be connected to receive the trigger signals applied to input 25 of binary B rather than to receive the signals on line 33, as shown.

Binaries connected according to the present invention provide decimal count information as the combinations of the output signals from the four binaries according to the 1–2–2–4 code. This means that if the output signals from binary A are weighted one unit, the output signals from binaries B and C are each weighted two units and the output signals from binary D are weighted four units. A diode matrix or other suitable interpolation circuit connected to receive the output signals from the four binaries may thus provide indications of the ten operating states of the four binaries. An output pulse may also be obtained at terminal 37 connected to the left half section either of binary B, C or D for each ten signals applied to input terminal 13.

I claim:

1. A circuit for counting recurring electrical signals, said circuit comprising a plurality of logic elements each having an initial condition of stability and an actuated condition of stability and having a pair of inputs, means for applying said signals alternately to each of the inputs of the first of said logic elements, means for deriving a trigger signal from the signal appearing at one input of said first logic element, a plurality of gates, means including a first one of said gates responsive to operation of the second of said logic elements in the initial condition of stability and adapted to apply said trigger signal to one input of said second logic element, means including a second one of said gates responsive to the operation of said second logic element in the actuated condition of stability and to the operation of the last of said logic elements in the initial condition of stability and adapted to apply said trigger signal to an input of said last logic element, means including a third gate responsive to the operation of the last logic element in the actuated condition of stability and to the operation of the second logic element in the actuated condition of stability and adapted to apply said trigger signal to the other input of said second logic element, means to apply to the other input of said last logic element the signal produced by a third one of said logic elements when switched from one condition of stability to the other condition of stability, and means to apply to the inputs of said third logic element one of the signals from said third gate and said second logic element operating in the initial condition of stability.

2. A circuit for counting recurring electrical signals, said circuit comprising a plurality of logic elements each having an initial condition of stability and an actuated condition of stability and having a pair of inputs, means for applying said signals alternately to each of the inputs of one logic element, means for deriving a trigger signal from the signal appearing at one input of said one logic element, means connecting the other logic elements in cascade, a plurality of gates, means including a first one of said gates responsive to operation of the first of said other logic elements in the initial condition of stability and adapted to apply said trigger signal to an input of the first of said other logic elements, means including a second one of said gates responsive to the operation of the first of said other logic elements in the actuated condition of stability and to the operation of the last of said other logic elements in the initial condition of stability and adapted to apply said trigger signal to an input of the last of said other logic elements, and means including a third gate responsive to the operation of the last logic element in the actuated condition of stability and to the operation of the first logic element in the actuated condition of stability and adapted to apply said trigger signal to the other input of said first logic element.

No references cited.

MALCOLM A. MORRISON, *Primary Examiner.*